July 29, 1947.　　　　　R. I. HOYLE　　　　　2,424,617
POWER STEERING MECHANISM FOR TRACTORS
Filed March 13, 1944　　　2 Sheets-Sheet 2

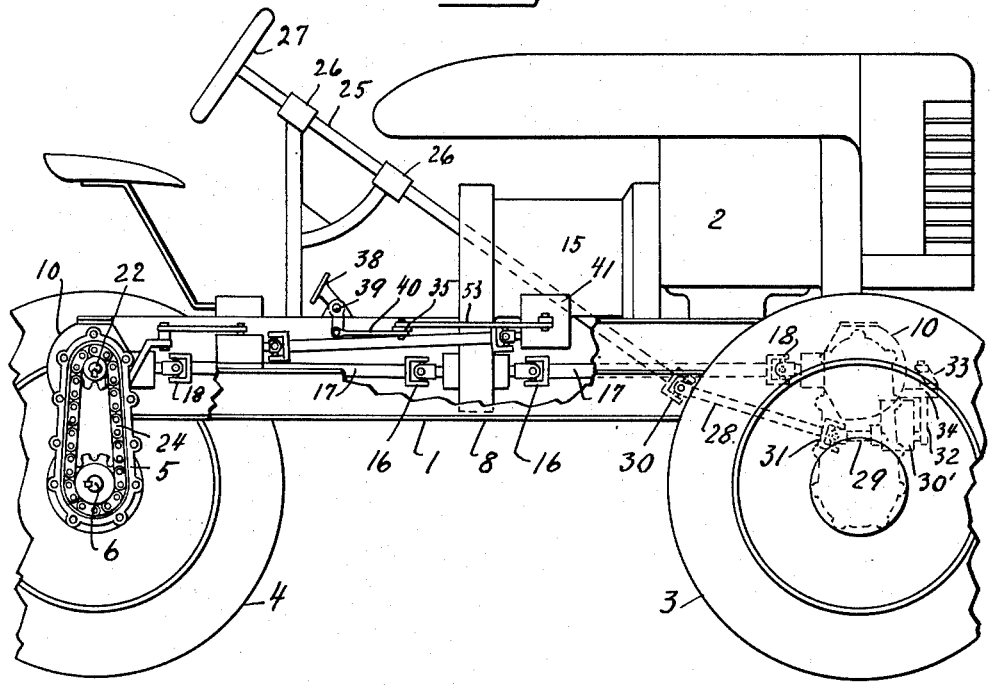

INVENTOR,
ROBERT I. HOYLE.
BY
A. Schapp
ATTORNEY.

Patented July 29, 1947

2,424,617

UNITED STATES PATENT OFFICE 2,424,617

POWER STEERING MECHANISM
FOR TRACTORS

Robert I. Hoyle, Camp Parks, Calif.

Application March 13, 1944, Serial No. 526,158

5 Claims. (Cl. 180—79.3)

The present invention relates to improvements in tractors, particularly of the type known as farm tractors, and its principal object is to introduce certain new features and improvements which will enhance the manoeuverability of the tractor.

More particularly, my invention relates to a four-wheel tractor, and it is proposed to provide means whereby power is transmitted to each of the four wheels from a power plant carried by the tractor.

It is further proposed to provide a four-wheel steering mechanism designed in such a manner that the rear wheels may be steered independently of the front wheels.

Another object of my invention is to provide independent operating means for the front and rear wheel steering mechanisms, the front wheels being preferably steered by a conventional hand wheel and the rear wheel steering mechanism by means of foot pedals.

A still further object of the invention is to connect the rear wheel steering mechanism with the power plant in such a manner that the power plant performs the work of steering the wheels while the operator exercises control over the steering mechanism through his foot pedals.

Incidental to the latter object it is proposed to provide means within the power drive for the steering mechanism whereby the rear wheels automatically retain the angularity to which they have been adjusted until the operator through positive control changes the angularity, and to provide automatic means for disengaging the power when the wheels have reached the limit of their turning movement.

The independent steering of the rear wheels of a tractor offers many advantages. If the rear wheels are turned in a direction opposite to that of the front wheels, a turning movement may be effected in a relatively limited area.

Depending upon the terrain and other conditions, the operator may throw the main burden of the turning movement upon one set of wheels or the other by adjusting the front and rear wheels to different angularities. Again, the operator may throw the entire burden of turning the tractor upon one set of wheels by leaving the other set in a straight position with respect to the tractor body.

On the other hand the operator may turn both sets of wheels in the same direction. If both sets of wheels are placed at the same angle, the tractor body will move uniformly in an oblique direction. If the angle of one set is accentuated with respect to that of the other, any desired effect of oblique forward or rearward movement may be obtained.

In operation, if the tractor is moved as a body in an oblique line, it will keep a trailing load "square" by reducing side thrust between load and tractor. Since all the four wheels move in the same direction, all wheels are turning at the same speed and the power is evenly distributed over the wheels. Frequent use of the steering brake usually provided in a tractor is reduced to a minimum.

When obstacles are encountered, the operator may readily avoid the same by turning either the front wheels or the rear wheels or both, in the same direction or in opposite directions, thus avoiding the necessity of stopping, backing up and numerous other operations.

When plowing on a hillside, the rear wheels may be set to prevent side slipping and to follow the furrow.

Other advantages are readily apparent, such as greater facility in getting out of tight corners, working in woodlands, backing up to wagons, trailer equipment and farm implements, backing into barns or sheds, lining up belts to drive pulleys, cutting a square course without waste when using a mowing machine or combined harvester, and many others.

It is another object of my invention to provide a tractor with a relatively light frame structure for clearing obstacles, and with suitable drive connections, in combination with the steering mechanism referred to.

Further objects and advantages of my invention will appear as the specification proceeds and the novel features of the same will be fully defined in the claims hereto attached.

The preferred form of my invention is illustrated in the accompanying drawing, in which:

Figure 1 shows a side elevation of my tractor, with certain parts broken away to disclose interior construction;

Figure 2, a fragmentary plan view of the tractor;

Figures 3, 4, 5:
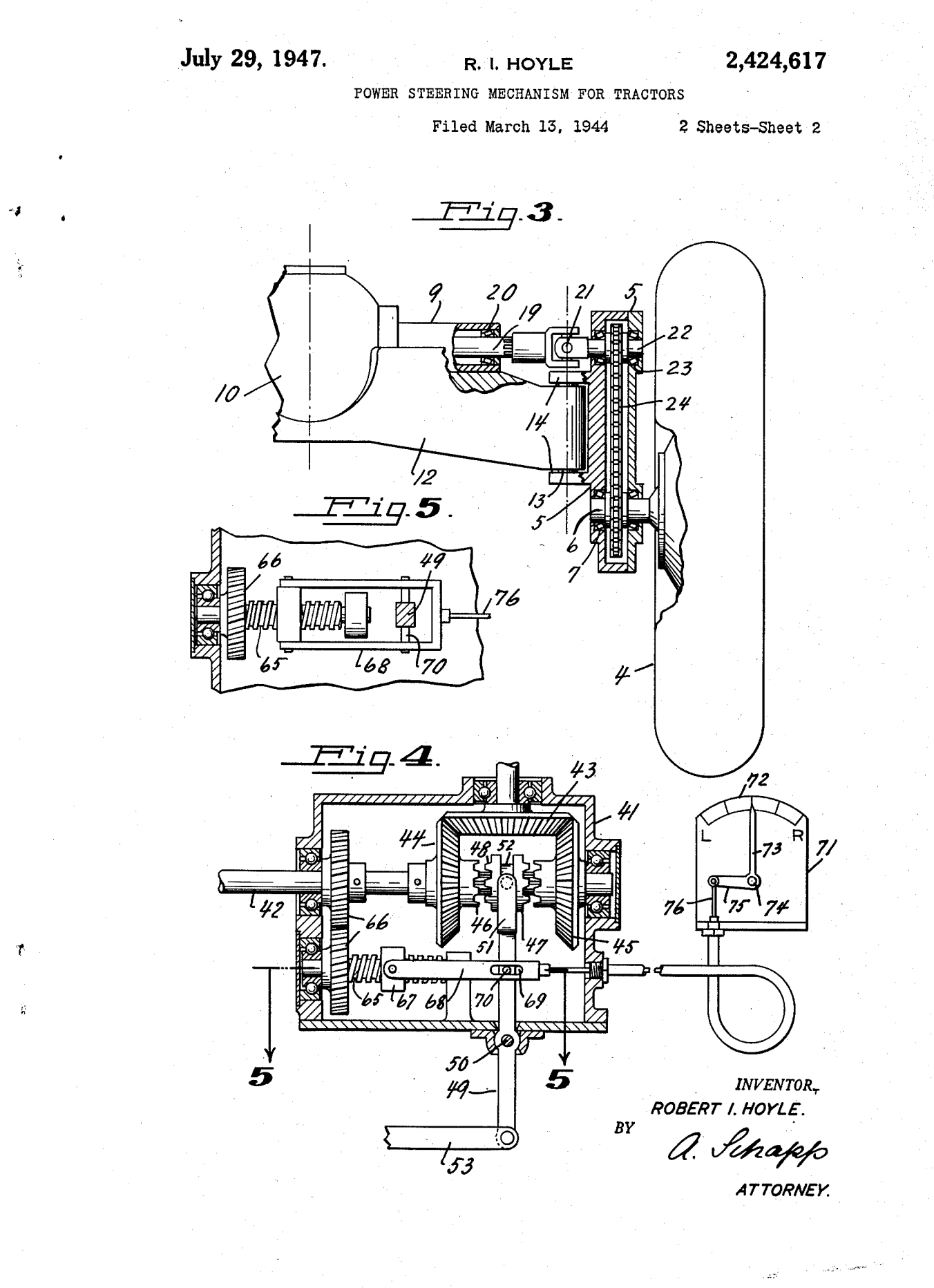

Figure 3, a fragmentary rear view of my tractor, showing the rear wheels driving mechanism in section;

Figure 4, a horizontal section showing details of a clutch mechanism with means for limiting the turning movement of the rear wheels and angularity indicating means; and Figure 5, a vertical section taken along line 5—5 Figure 4.

While I have shown only the preferred form of my invention, I wish to have it understood that various changes or modifications may be made within the scope of the claims hereto attached without departing from the spirit of the invention.

Referring to the drawings in detail, my tractor comprises in its principal features a main frame 1 having the power plant 2 supported on the front end thereof, front wheels 3 and rear wheels 4 supporting the frame at an elevation considerably higher than the wheel axles, a four wheel drive for the wheels, and steering means for steering the rear wheels indpendently of the front wheels and vice versa.

The main frame is supported on the wheels in elevated, horizontal position by means of vertical housings 5 supported on the wheel axles 6, through suitable bearings 7. The frame comprises longitudinal beams 8 connected at their rear ends by the rear axle housing 9 which latter has the differential housings 10 incorporated therein.

The front ends of the beams 8 are connected by a cross-member 9' having a central bearing 10' revolvable on a journal 11' projecting from the differential of the front axle housing 9. This arrangement allows the front axle housing to tilt with respect to the main frame. Suitable bracing or spacing members 11 interconnect the beams 8 at selected locations.

The axle housings terminate, at their ends, in strong supporting members 12 which slant downward to some extent to bring the main frame to a higher elevation and which are journalled, at their ends, on pivots 13 supported by the housings 5 between brackets 14.

The wheels thus support the main frame substantially on a level with the upper wheel portions, and are free to turn with respect to the main frame on the pivots 13. It should be understood that, while only one wheel mounting is shown in detail in Figure 3, all the wheel mountings are constructed in the same manner.

The power plant 2 may be of any suitable design, and is provided with a conventional transmission, indicated at 15, which drives, through suitable gearing (not shown) and through the universal joints 16, front and rear shafts 17, which again drive, through universal joints 18, the differential transmissions (not shown) in the differential housings 10, from which power is transmitted, in a conventional manner to the front and rear wheel drive shafts 19 having bearing in the axle housings 9, as at 20.

The drive shafts 19 are connected, through universal joints 21, with stub shafts 22 having bearing in the upper ends of the frame supporting housings 5, at 23, the universal joints 21 being disposed in vertical alinement with the pivots 13 to allow of free turning movement of the wheels with respect to the frame. The stub shafts 22 are connected to the wheel axles 6 by suitable chain drives 24. The drives for the front and rear wheels are substantially symmetrical.

The front wheel steering mechanism may be of more or less conventional form. It may comprise a steering post 25 mounted in bearings 26 and provided with a hand-operated steering wheel 27, extension links 28 and 29 connected to the steering post through universal joints 30 and 31, a suitable worm steering drive indicated at 30', an arm 32 operated by the latter, the rods 33 connected to the free end of the arm and secured, at their opposite ends, to rigid members 34 projecting forwardly from the housings 5 supporting the main frame.

The rear wheel steering mechanism is preferably power-operated and subject to foot control. Its principal control element is a lever 35 pivoted to a frame member 36, as at 37, so as to have a long arm and a short arm. The lever normally lies transversely in the main frame. The long arm may be swung forward or backwards by the use of one or the other of two foot pedals 38, both preferably positioned for operation by the left foot of the operator.

The foot pedals, which are pivoted in the main frame, as at 39, operate the links 40 which are pivoted to the lever 35 on opposite sides of the lever pivot, as shown in Figure 2.

When the left-hand foot pedal is pressed downward, the long arm of the lever swings rearward, and when the right-foot pedal is depressed, the long lever arm swings forward.

The long arm of the lever 35 operates a clutch mechanism accommodated in a housing 41 attached to the transmission housing 15 and thereby effects a power drive, in one direction or the other, of a stub-shaft 42 longitudinally mounted in the housing with freedom of rotary motion.

A bevel gear 43 is mounted in the housing alongside of the stub shaft, on a transverse axis, and receives rotary motion, through any suitable arrangement, not shown, from the main transmission.

Two additional bevel gears 44 and 45 are mounted on the stub shaft with freedom of rotary motion thereon, and are made to mesh with the bevel gear 43. These bevel gears revolve at all times, as long as the main transmission is in operation. Each of the bevel gears 44 and 45 is provided, at its inner surface, with clutch teeth 46.

A clutch member 47 is splined to the stub shaft between the two bevel gears 44 and 45 with freedom of sliding motion. It is provided, at opposite ends, with clutch teeth 48 adapted to mesh with the clutch teeth on either bevel gear.

When the clutch member is in neutral or intermediate positions, it is out of mesh with either bevel gears 44—45. When it is moved forward, it engages with bevel gear 45 and rotates the stub shaft 42 in one direction. When it is moved rearward, it enters into mesh with the gear wheel 44 and operates the stub shaft in the opposite direction.

The clutch member 47 is operated by a link 49 pivoted in the frame, as at 50. This link has, at one end, a fork 51 engaging over a groove 52 in the clutch member, and is connected, at its other end, to a link 53 operated by the long arm of the lever 35.

The stub shaft 42 is connected, through an intermediate shaft 54, and universal joints 55 and 56, to a second stub shaft 57 carrying a worm 58 meshing with a worm gear sector 59 secured upon a pivot 60 carrying an arm 61. The latter is bifurcated at its free end and operates the tie-rods 62, which latter are connected to frame members 63 projecting forwardly from the housings 5 supporting the main frame.

Thus, with the bevel gear 43 operating in the proper direction, when the left-hand foot pedal is depressed, the rear wheels will turn to the left on their pivots 13, and when the right pedal is depressed, the rear wheels will turn to the right, these turning movements being effected independently of any steering of the front wheels.

Suitable means, such as springs (not shown) are provided for returning the arm 35 and the clutch to neutral position, when the pressure on the foot pedal is released.

The worm drive 58—59, forming part of the power-transmitting chain, serves as a locking means for holding the wheels in any position to which they have been adjusted, so that positive action on the part of the operator is necessary to change any angular position back to normal or to angular position in the opposite direction.

There is a limit, of course, to the angle to which the rear wheels can be turned, and, in order to automatically disengage the clutch when the approximate limit of the turning movement has been reached, I provide the arrangement shown in Figure 4, in connection with the clutch mechanism.

This arrangement comprises a worm shaft 65 mounted in the housing 41 in parallel relation to the shaft 42 and geared thereto, as at 66. The worm shaft carries a nut 67 which is held against rotation by a box 68 straddling the arm 49. The sides of the box are slotted, as at 69 and the slots engage over opposite ends of a pin 70 projecting from the top and bottom of the arm 49.

In operation, when the link 53 is pushed forward for a right hand turn of the rear wheels the clutch member 47 swings rearward for engagement with the bevel gear 44. At the same time the pin 70 swings rearward in the slot 69. As the turning movement is executed, the nut 67 works forward on the worm shaft 65, and when the approximate limit of the turning movement is reached, the left end of the slot 69 reaches the pin 70 and pushes the clutch 47 out of engagement.

The box 68 is also utilized to operate the indicator 71, which may be located at any suitable place within the sight of the operator.

The indicator has a dial 72 marked "L" and "R," respectively for left and right, and has a pointer 73 pivoted, as at 74. The pointer has an arm 75 actuated by a flexible rod 76 connected to the box 68. As the latter advances on the worm shaft 65 in response to a right turning movement, the pointer 73 swings to the right and indicates, by its position, the extent of the turning movement.

I claim:

1. A tractor comprising a main frame, a power plant supported thereby, a pair of rear wheels supporting one end of the frame and having pivotal connection therewith, arms connected to the wheels and having a pair of tie-rods connected thereto, a worm gear having an arm for operating the tie-rods, means driven by the power plant for operating the worm gear and foot-operated means for rendering the first-named means active, the second-named means including a lever pivoted to lie transversely across the frame substantially midway the length thereof and a pair of foot pedals having connection with the lever on opposite sides of the pivot.

2. In combination, a tractor having a power plant and steering wheels, a stub shaft having connection with the wheels for turning the same, a driving connection between the power plant and the stub shaft including a clutch member and a pair of gears adapted for selective engagement by the clutch member to cause rotation of the stub shaft in relatively reverse directions, a lever operable to move the clutch member into engagement for turning the wheels, a worm mounted for operation by the stub shaft, and a driving connection between the worm and the lever for disengaging the clutch member when the steering wheels have reached a desired position.

3. In combination, a tractor having a power plant and steering wheels, a stub shaft having connection with the wheels for turning the same, a driving connection between the power plant and the stub shaft including a clutch member and a pair of gears adapted for selective engagement by the clutch member to cause rotation of the stub shaft in relatively reverse directions, a lever operable to move the clutch member into engagement for turning the wheels, a worm mounted for operation by the stub shaft, a nut on the worm, a box attached to the nut and straddling the lever and having a slot therein, and a pin on the lever projecting into the slot, the box being operable for cooperation with the pin in disengaging the clutch member when the steering wheels have reached a desired position.

4. A tractor having a main frame, a power plant carried thereby, a pair of rear wheels supporting one end of the frame and having pivotal connection therewith, a lever pivoted in the frame to lie transversely across the same, foot pedals having connection with the lever on opposite sides of the pivot whereby the free end of the lever may be swung in one direction or another by operation of the foot pedals, and connections between the free end of the lever and the wheels whereby the latter may be turned in one direction or another, the said connections including a selective gear mechanism driven by the power plant and operable by the free end of the lever and a steering connection between the gear mechanism and the wheels.

5. A tractor having a main frame, a power plant carried thereby, a pair of rear wheels supporting one end of frame and having pivotal connection therewith, a lever pivoted in the frame to lie transversely across the same, foot pedals having connection with the lever on opposite sides of the pivot whereby the free end of the lever may be swung in one direction or another by operation of the foot pedals, and connections between the free end of the lever and the wheels whereby the latter may be turned in one direction or another, the said connections including a selective gear mechanism driven by the power plant and operable by the free end of the lever, an arm on each wheel, a pair of tie rods connected to the arms, a worm gear having an arm operating the tie rods, and a worm operating the worm gear and connected to the selective mechanism.

ROBERT I. HOYLE.

REFERENCES CITED

The following references are of record in the file of this patent:

UNITED STATES PATENTS

| Number | Name | Date |
| --- | --- | --- |
| 2,234,888 | Blagdon | Mar. 11, 1941 |
| 1,305,325 | Wiederhold | June 3, 1919 |
| 1,309,261 | Sheldon | June 8, 1919 |
| 1,403,259 | Lewis | Jan. 10, 1922 |
| 1,458,560 | Tolson | June 12, 1923 |
| 1,476,886 | Haubert | Dec. 11, 1923 |
| 1,570,832 | Hasselberg | Jan. 26, 1926 |
| 1,939,453 | Lang | Dec. 12, 1933 |
| 1,939,454 | Lang | Dec. 12, 1933 |
| 2,272,603 | Ellis | Feb. 10, 1942 |
| 936,595 | Alperin | Oct. 12, 1909 |
| 1,210,056 | Fairman | Dec. 26, 1916 |
| 876,070 | Macfarren | Jan. 7, 1908 |